Jan. 9, 1945.　　　L. F. CARTER ET AL　　　2,366,707
DIRECTIONAL GYRO
Filed April 30, 1941　　　2 Sheets-Sheet 1

INVENTORS
LESLIE F. CARTER
FREDERICK D. BRADDON
BY
*Herbert H. Thompson*
THEIR ATTORNEY Jan. 9, 1945.  L. F. CARTER ET AL  2,366,707
DIRECTIONAL GYRO
Filed April 30, 1941  2 Sheets-Sheet 2
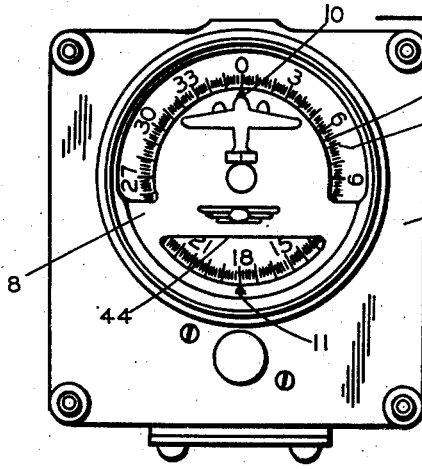
Fig. 4.
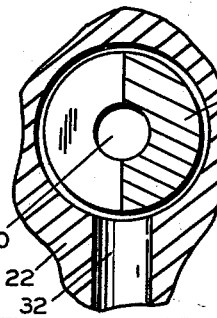
Fig. 5.
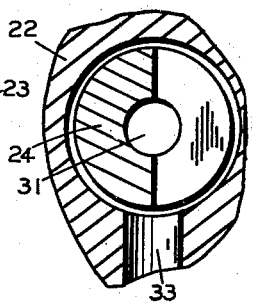
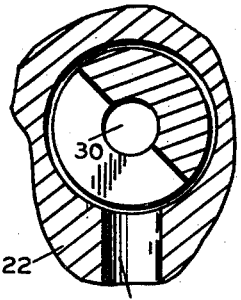
Fig. 6.
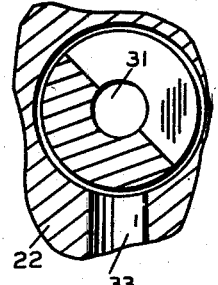
Fig. 7.
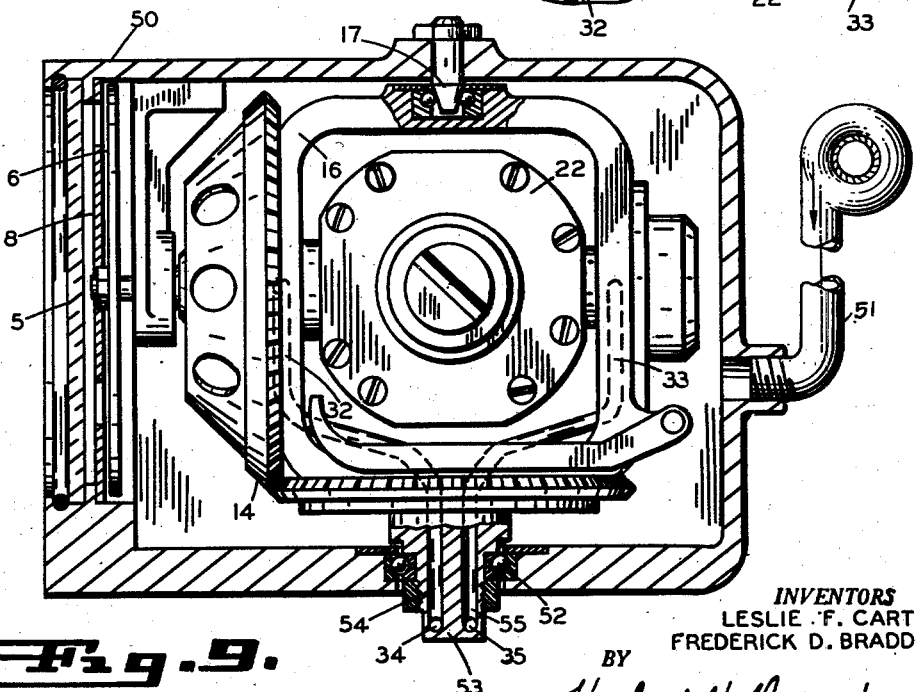
Fig. 9.
INVENTORS
LESLIE F. CARTER
FREDERICK D. BRADDON
BY
Herbert H. Thompson
THEIR ATTORNEY Patented Jan. 9, 1945

2,366,707

UNITED STATES PATENT OFFICE 2,366,707

DIRECTIONAL GYRO

Leslie F. Carter, Leonia, N. J., and Frederick D. Braddon, Babylon, N. Y., assignors to Sperry Gyroscope Company, Inc., Brooklyn, N. Y., a corporation of New York Application April 30, 1941, Serial No. 391,060

8 Claims. (Cl. 74—5).

This invention relates to gyroscopes and particularly to an improvement in pneumatically operated gyros of the direction indicating type and the gimbal system therefor.

One of the objects of the invention is to avoid any drift of the gyro resulting from disturbing forces imposed on the gimbal or ring system through the effect of air turbulence within the housing.

Another object is to obviate precessional forces arising from air leakage at the gimbal bearing air seals in the conventional type of directional gyro in which the entire housing for the parts is evacuated.

An important feature of the invention consists in constructing the gimbal or vertical ring system of the gyro with passageways so that the interior of the enclosed rotor bearing case of the instrument supported thereby may be directly evacuated from the exterior of the outer housing without evacuating the housing itself as is common in the art. Because of this feature, the desirable advantage is obtained of being able to run, calibrate and balance the instrument with the housing open to give access to the gyroscope, which cannot be done with the evacuated type of housing.

According to our invention, we retain the outer casing or housing to provide protection for the instrument but provide it with a separable cover plate which may be removed without disturbing the instrument and which is preferably put in place after the required calibration and balance tests on the instrument have been completed, the instrument then performing in the same manner as it did when not completely housed which is virtually impossible with the usual evacuated case type of instrument.

Another feature of the invention resides in the provision of a special air sealed chamber at one of the mountings of the vertical gimbal ring of the instrument which facilitates the withdrawal of air from an enclosed rotor bearing case having jet producing openings in the body thereof.

A further important feature of the invention consists in the utilization of separate passageways in the vertical ring structure of the gyro having discharge ports by which an erecting torque may be exerted about the vertical axis of the ring, each of the passageways being provided with oppositely functioning air valves so that a differential discharge of air from the ports is obtained which exerts a torque proportional in amount to the degree of tilt of the spin axis of the rotor of the gyro from a perpendicular relation to the vertical axis of the ring.

Other objects, features and structural details of the invention will be apparent from the following description when read in connection with the accompanying drawings, wherein Fig. 1 is a front elevation of the improved gyroscopic instrument showing the way it appears to the observer.

Figs. 4 and 5 are enlarged detail cross-sections showing corresponding position views of the right and left hand air valves utilized in the form of the invention shown in Fig. 2.

Figs. 6 and 7 are views similar to Figs. 4 and 5 illustrating the manner in which the opposingly situated valves operate when the rotor bearing case is tilted so that the spin axis of the rotor thereof is not in perpendicular relation to the axis of the ring.

Fig. 8 is a view similar to Fig. 1 showing a different compass card construction in the improved instrument, and Fig. 9 is a view similar to Fig. 2, showing a modified instrument, constructed in accordance with the present invention, enclosed in an air-tight outer casing in which a superatmospheric pressure is maintained to spin the rotor of the gyroscope and maintain the rotor case level.

Figure 1:
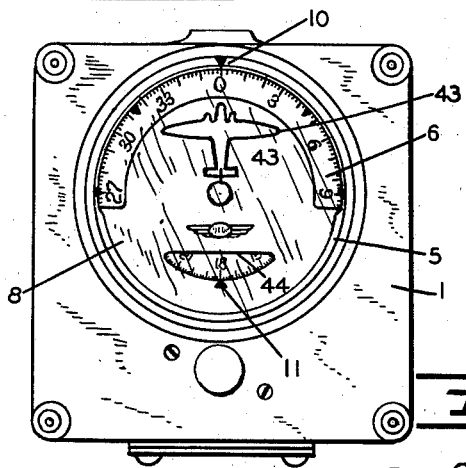
Figure 3:
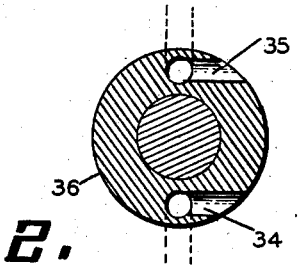
Fig. 3 is a section showing in detail the particular sleeve construction employed in Fig. 2 in providing the discharge ports for the air by means of which the rotor case of the gyro is maintained erect.
Figure 2:
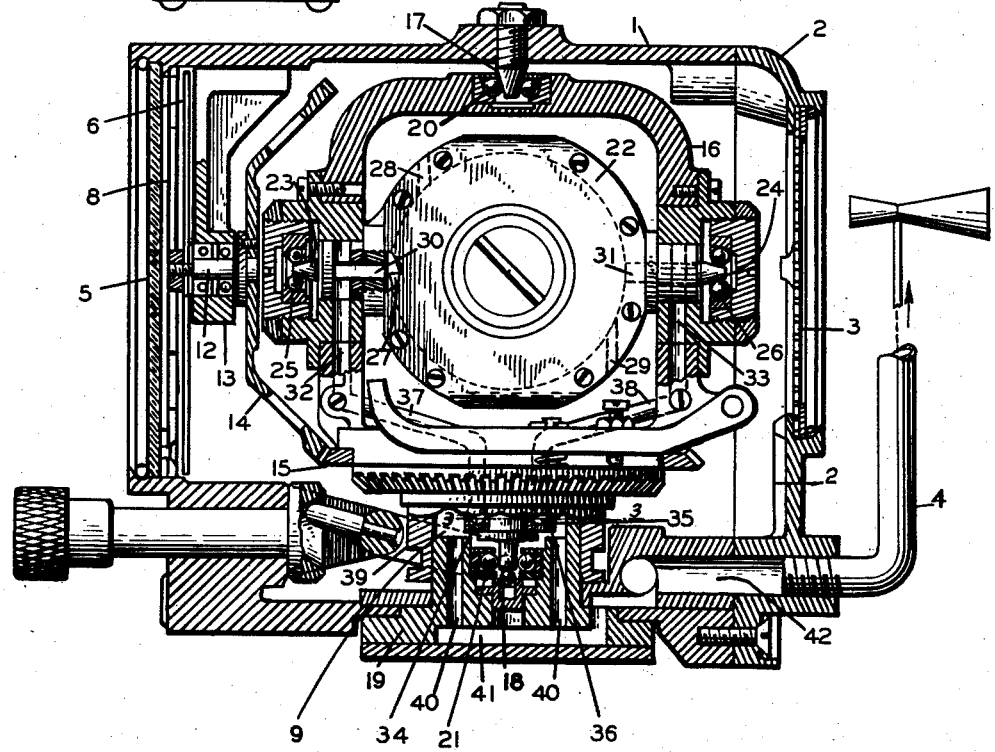
Fig. 2 is a side vertical section of the preferred form of directional gyro instrument illustrated in the drawings.

With particular reference to Figs. 1 and 2, in the preferable form in which the present inventive concepts are disclosed, the improved gyro of the direction indicating type is shown as enclosed within an outer casing or housing 1, one side or end of which is constructed as a removable cover 2 which contains an air filter 3 and a pipe connection 4 leading to a suitable suction means which draws the air from the instrument in the direction indicated by the arrow. The casing 1 also includes a front window 5 through which a suitably graduated compass card 6 is visible to the observer of the instrument. A mask 8 on which lubber lines 10 and 11 are marked is located in front of the card 6, in this instance.

Card 6 is mounted for rotational movement with shaft 12 which is journalled in bearing 13 and driven by large gear 14 which meshes with gear 15 situated on the lower portion of the vertical gimbal ring 16. A desirable pivotal mounting is provided for the vertical ring 16 which in the construction shown is accomplished by means of trunnions 17 and 18, and the respective ball bearings 20 and 21. In the improved instrument, the enclosed rotor bearing case 22 is rotatably mounted on the horizontal trunnions 23 and 24 in ball bearings 25 and 26, respectively, located on and forming part of the vertical gimbal ring 16. An air spun rotor element of any desirable type is contained within the rotor bearing case 22, one of the blades of the rotor element, on which the air impinges to drive the rotor, being indicated at 27. In this instance, air is directly drawn into the enclosed rotor bearing case 22 through the provided jet producing openings 28 and 29 therein, the air at atmospheric pressure being admitted to the interior of the housing 1 by way of filter 3. Such jet producing openings form a means by which air is supplied to the enclosed rotor case to spin the rotor element therein.

The air is withdrawn from the interior of the rotor case 22 through the opposite longitudinal passageways 30 and 31 provided in a portion of the respective horizontal trunnions 23 and 24. A part of the respective trunnions 23 and 24 is constructed to form an air valve with vertically extending passageways 32 and 33, located in the respective sides of the gimbal ring 16. Semicircularly shaped cutout portions, Figs. 4 and 5, in the trunnions 23 and 24, disposed on opposite sides thereof, with the passageways 32 and 33 provide the herein disclosed air valves. The position of the left-hand air valve, as viewed in Fig. 2, is shown in Fig. 4 while that of the right-hand valve is shown in Fig. 5, both valves being indicated therein as half open which permits an equal flow of air through each of the same. Such a position may be considered the normal position of the respective valves, the same being assumed when the horizontal spin axis of the gyro rotor is perpendicularly disposed with relation to the axis of the vertical ring or in other words when the gyro case is properly level. The respective trunnion passageways 30 and 31 and air valves divide the air traveling from the interior of the rotor bearing case 22 and in connection with the laterally directed ports 34 and 35 in a sleeve 36 fixed on the base trunnion 18 of the vertical ring 16 provides the levelling means for the improved gyro. Pipe members 37 and 38, respectively, are employed in this instance to suitably connect the passageway 32 with port 34 and passageway 33 with port 35.

The opposing ports 34 and 35 in the sleeve 36 are situated the same radial distance from the center of the axis of rotation of the ring 16 to obtain the specified normal torque balance of the levelling means when the rotor case is level. The air exhausting from the ports 34 and 35, when the valves are positioned as shown in Figs. 4 and 5, exerts equal and opposite torques on the ring 16 about its vertical axis to provide this balance.

The function of the respective air valves in the horizontal gimbal bearings which support the enclosed rotor case is to differentially vary the air flow from the ports 34 and 35 in the provided sleeve 36 in proportion to the degree of tilt of the axis of the rotor of the gyro from a normal position. Relative positions of the two valves are shown in an extreme instance, in Figs. 6 and 7, in which the passageway 32 is fully opened while passageway 33 is entirely closed. In such an event, the air is only exhausted through port 34 to produce a torque about the axis of the vertical ring 16 in the proper direction to effect a precessional movement of the rotor case to a levelled condition. The created differential levelling torque about the vertical axis of ring 16 is consequently made proportional in amount to the degree of tilt of the rotor bearing case from its levelled position in accordance with the teaching of the present invention. Also, the direction that the torque is effective in depends on the direction in which the gyro case tilts on its horizontal axis.

The air from ports 34 and 35 discharges into an air sealed chamber or enclosure 9 formed in the present instance by an interiorly extending cylindrical member 19, connected to the base of housing 1, and a longitudinally movable cylindrical element 39 which is a part of the caging mechanism employed in the present instrument. Passageways 40 and 41 are situated in the member 19, the same connecting the chamber 9 with the passageway 42 in the base of the housing 1. The passageway 42 is aligned with the opening in the cover 2 in which the pipe connection 4 to the suction source is located, such system of passageways enabling the suction source to continually evacuate the chamber 9 and provide a means by which the air is withdrawn from the chamber.

From the foregoing it will be obvious that the cover 2 may be removed entirely from the rear of the casing 1 to give ready access to the gyroscope, and at the same time the gyro may be operated and tested in the same manner as if the casing 1 were closed by the back cover 2. This was not possible in the majority of vacuum driven aircraft instruments in use, since the usual practice is to exhaust air from the interior of the casing 1, which of course is impossible if the back cover is removed. In our invention on the other hand, the gyroscope may be fully operated without the back cover merely by connecting the exhaust pump to passage 42.

In the modification of the invention shown in Fig. 9, an outer air-tight casing 50 is provided for the instrument, the same being suitably supplied with air at a pressure above atmospheric by means of a pump through the pipe connection 51. In this instance, the bearing 52 provided in the base of the casing 50 is air-tight and the trunnion 53 for the ring 16 extends exteriorly of the provided casing. The ports 34 and 35, in this form of the invention, connect with the passageways 32 and 33 through the spaced vertically extending openings 54 and 55, respectively, which are situated in the extended portion of the body of the trunnion 53. The air contained within the casing 50 is consequently forced through the jet producing openings 28 and 29 in the enclosed rotor case to spin the rotor element, the same then passing through the air valves and passageways previously described to exhaust to the atmosphere exteriorly of the casing and maintain the rotor bearing case level in accordance with the teaching of the present invention.

With particular reference to Figs. 1 and 8, two different arrangements of the compass card and mask are shown. In Fig. 1, the card 6 is provided with an outer and inner set of concentrically spaced graduations thereon, each of which divides the respective circles into suitable parts of the total of the indicated 360° thereof. In this instance, the noted indications on the inner circle of graduations of the card 6 are spaced 180° from the same indications contained on the outer circle. The upper part of the mask 8 is constructed to include an upwardly extending semi-circular portion 43 which covers the indications and graduations of the inner circle while permitting the observer to read the outer circle graduations and the indications thereof with reference to the lubbers line 10. As shown in Fig. 1, this indication is 0°.

A small opening 44 having one side arcuate in form is provided in the lower portion of the mask 8. The arcuately formed side of the opening 44 is located in the mask so that the indications and graduations on the inner circle of the card 6 are comparable with the lubbers line 11 while the outer circle is completely covered. As noted herein, the indication on the inner circle graduation, with reference to the line 11, is 180°. The observer is consequently aware of the required position, at all times, into which to bring the card 6 to obtain an accurate and complete change in the heading of the craft on which the improved instrument is employed.

With reference to Fig. 8, a change of the arrangement of card 6 and mask 8, as illustrated in Fig. 1, is shown. In this figure, the indications are placed on opposite sides of a single graduated circular scale 45 and the shape of the mask 8 is altered slightly to accommodate this change.

While we have described what we consider to be highly desirable embodiments of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What is claimed is:

1. A pneumatically operated directional gyro having a rotor, an enclosed rotor bearing case, an aperture therethrough by which the supplied air spins the rotor, a rotatably mounted vertical ring within which the case is mounted to pivot about a horizontal axis, said ring and rotor bearing case mounting being provided with a pair of passageways, each pair comprising a plurality of connecting channels extending from the interior of the case and terminating in laterally directed ports in said ring from which the exhaust air is adapted to normally exert equal and opposite torques on said ring about its vertical axis and a valve between the channels in each passageway operative to oppositely vary the air flow in the respective passageways upon relative tilt of said case and vertical ring to obtain a differential flow of air from the ports thereby producing a levelling torque for the rotor bearing case.

2. In a pneumatically operated directional gyroscope, a separable, two part housing, a rotor, a rotor bearing case having an air jet intake for spinning the rotor, and a vertical ring rotatably mounted within one part of said housing about a vertical axis, of pivoted means mounting said case in said ring for movement about a horizontal axis, said vertical ring and pivoted means having two separate passageways therein by which air flows from the interior of the case through the vertical ring, ports in said ring positioned to exert opposing torques about the vertical axis of said ring, a chamber within said part of said housing enclosing said ports, and air valves disposed in each of said passageways controlled by the relative tilt of said case and ring, whereby a differential levelling torque about the vertical axis proportional to the degree of tilt of said case with respect to the vertical axis of said ring is obtained, and whereby the gyroscope may be run and tested by withdrawing air from said chamber without the other part of said housing.

3. A pneumatically operated directional gyro having a rotor, an enclosed rotor bearing case, means by which the supplied air spins the rotor, a rotatably mounted vertical ring within which the case is mounted on trunnions to pivot about a horizontal axis, an air sealed chamber at one of the mountings of the vertical ring, said vertical ring and the trunnions for the case having two separate passageways therein by which air flows from the interior of the rotor bearing case to exhaust into the chamber, valve means controlled by the trunnions to regulate the amount of air flowing in the respective passageways in the vertical ring, means for exhausting the air from the passageways into the chamber to obtain a levelling torque about the vertical axis of the ring proportional in amount to the degree of tilt of the rotor bearing case from a level position, and means by which the air is withdrawn from the chamber.

4. A pneumatically operated directional gyro having a rotor, an enclosed rotor bearing case, means by which the supplied air spins the rotor, a ring mounted for freedom about a vertical axis and upon which the case is mounted on trunnions to pivot about a horizontal axis, an air sealed chamber at one of the mountings of the vertical ring, said vertical ring and the trunnions for the case having two separate passageways therein by which air flows from the interior of the rotor bearing case to exhaust into the chamber, the trunnions being constructed to form oppositely disposed air valves cooperating with the passageways in the vertical ring to control the amount of air flowing therethrough, means comprising laterally directed discharge ports connected to said passageways from which the controlled air is exhausted on opposite sides of the vertical axis of said ring and into said chamber for obtaining a differential levelling torque proportional in amount and reversible in direction with the degree and direction of tilt of the spin axis of the rotor from a perpendicular relation to the vertical axis of the ring, and means by which the air is withdrawn from the chamber.

5. A pneumatically levelled directional gyro having a housing, a rotor, an enclosed rotor bearing case, a vertical ring, trunnion supports between said case and ring having channels therein to the interior of said case, jet means through the case for spinning the rotor, the portions of the trunnions adjacent the vertical ring being constructed to form oppositely positioned air valves in conjunction with passageways situated in the respective sides of the vertical ring to differentially vary the air flow therethrough upon tilt of said case, vertical trunnion supports between said ring and said housing, at least one of which extends beyond said housing and through which said passageways extend to terminate in laterally directed ports beyond the housing from which the exhaust air normally exerts equal and opposite torques on said ring about its vertical axis, and means for maintaning said housing under pressure, whereby compressed air is forced through said jet means to spin the rotor and the exhaust air differentially flows through said ports without the housing at variable rates controlled by the tilt of the casing in the vertical ring.

6. A pneumatically operated directional gyro having a rotor, an enclosed rotor bearing case, an aperture therethrough by which the supplied air spins the rotor, a rotatably mounted vertical ring within which the case is mounted to pivot about a horizontal axis, said ring and rotor bearing case mounting being provided with a pair of connected passageways, each pair extending from the interior of the case and terminating in laterally directed ports in said ring from which the exhaust air is adapted to normally exert equal and opposite torques on said ring about its vertical axis, said ports being within a small chamber, means whereby air may be exhausted from said chamber, and a valve in each passageway operative to oppositely vary the air flow in the respective passageways upon relative tilt of said case and vertical ring to obtain a differential flow of air from the ports thereby producing a levelling torque for the rotor bearing case.

7. In an air spun directional gyroscope, a rotor, a bearing casing enclosing the same and having a jet-forming aperture therein for spinning the rotor, a vertical ring, horizontal bearings supporting said casing in said ring for movement about a horizontal axis, a closed outer housing, vertical bearings supporting said ring for turning about a vertical axis in said housing, an exhaust passage leading from within said casing through at least one of said horizontal bearings, through said vertical ring and through at least one of said vertical bearings, and terminating in a port located without the space enclosed by said housing and surrounding said gyroscope, and means for maintaining the interior of said housing under super-atmospheric pressure, whereby compressed air is forced through said jet aperture to spin the rotor and the disturbing effect of eddy currents from the exhaust air from the gyroscope is avoided.

8. A pneumatically levelled directional gyro having a housing, a rotor, an enclosed rotor bearing case, a vertical ring, trunnion supports between said case and ring having channels therein to the interior of said case, jet means through the case for spinning the rotor, the portions of the trunnions adjacent the vertical ring being constructed to form oppositely positioned air valves in conjunction with passageways situated in the respective sides of the vertical ring to differentially vary the air flow therethrough upon tilt of said case, vertical trunnion supports between said ring and said housing, at least one of which extends beyond said housing and through which said passageways extend to terminate in laterally directed ports beyond the space around the gyro enclosed by the housing from which the exhaust air normally exerts equal and opposite torques on said ring about its vertical axis, and means for maintaining a difference in pressure between the space in said housing and said exhaust ports, whereby air is forced through said jet means to spin the rotor, the exhaust air differentially flows through said ports to eliminate tilt of said case, and eddy currents within the housing are prevented.

LESLIE F. CARTER.
FREDERICK D. BRADDON.